United States Patent [19]
Watkins et al.

[11] Patent Number: 5,797,045
[45] Date of Patent: Aug. 18, 1998

[54] THREE ROLLER FILM WINDER AND METHOD

[75] Inventors: Joseph A. Watkins, Rochester; Dennis R. Zander, Penfield; Matthew Stanzione, Spencerport, all of N.Y.

[73] Assignee: Eastman Kodak Company, Rochester, N.Y.

[21] Appl. No.: 866,867

[22] Filed: May 30, 1997

[51] Int. Cl.$^6$ ............................................. G03B 17/02
[52] U.S. Cl. ............................................. 396/6; 242/538.4
[58] Field of Search ............................ 396/6, 387, 411, 396/418, 429, 661; 242/538, 538.2, 538.4, DIG. 3

[56] References Cited

U.S. PATENT DOCUMENTS

| 651,118 | 6/1900 | Pascal et al. |
| 1,921,559 | 8/1933 | Case. |
| 1,921,560 | 8/1933 | Case. |

(List continued on next page.)

FOREIGN PATENT DOCUMENTS

| 0743 546 A1 | 11/1996 | European Pat. Off. |
| 0 750 216 A1 | 12/1996 | European Pat. Off. |
| 38-20424 | 10/1963 | Japan. |
| 63-271325 | 11/1988 | Japan. |
| 3-2741 | 1/1991 | Japan. |
| 3-2751 | 1/1991 | Japan. |
| 3-2752A | 1/1991 | Japan. |
| 5-134361 | 5/1993 | Japan. |
| 5-323517 | 12/1993 | Japan. |
| 6-130568A | 5/1994 | Japan. |
| 6-289541 | 10/1994 | Japan. |
| 6-295020 | 10/1994 | Japan. |
| 6-295022 | 10/1994 | Japan. |
| 6-332118 | 12/1994 | Japan. |
| 7-13279 | 1/1995 | Japan. |
| 7-5526 | 1/1995 | Japan. |
| 7-209721 | 8/1995 | Japan. |
| 7-219156 | 8/1995 | Japan. |
| 8-171180 | 7/1996 | Japan. |
| 8-171181 | 7/1996 | Japan. |
| 8-262633 | 10/1996 | Japan. |
| 8-262636 | 10/1996 | Japan. |
| 8-314071 | 11/1996 | Japan. |
| 9-43777 | 2/1997 | Japan. |
| 9-43778 | 2/1997 | Japan. |
| 9-43779 | 2/1997 | Japan. |
| 558515 | 1/1944 | United Kingdom. |
| 1060937 | 3/1967 | United Kingdom. |

OTHER PUBLICATIONS

U.S. Patent Application Serial No. 08/569,634 filed 08 Dec. 1995 (now U.S. Patent 5,689,745, issued Nov. 18, 1997).

U.S. Patent Application Serial No. 08/607,844 filed 27 Feb. 1996.

*Primary Examiner*—Howard B. Blankenship
*Attorney, Agent, or Firm*—Robert Luke Walker

[57] ABSTRACT

A three roller film winder and method for loading photographic film. In the method, a film cartridge is positioned in a cartridge chamber of a camera frame assembly. The camera frame assembly has the cartridge chamber, a supply chamber, and an intermediate section between the chambers. The film cartridge includes a spool and a filmstrip. The filmstrip has leading, main, and tail portions. A sleeve is introduced into the supply chamber. An upper roller is disposed over the sleeve. A pair of lower rollers are introduced into the supply chamber. The upper and lower rollers together define a substantially cylindrical scroll space. The leading portion of the filmstrip is advanced out of the cartridge and into the sleeve. The leading portion is curled within the sleeve and scroll space into an initial filmstrip scroll having at least one turn. The sleeve is retracted after the curling step. The main portion of the filmstrip is propelled between the upper and lower rollers to wind the main portion over the initial scroll. During the propelling, the spatial separation of the lower rollers from the upper roller is increased. This increases the diameter of the scroll space. The rollers are removed and the camera frame assembly is light-tightly closed.

25 Claims, 12 Drawing Sheets

U.S. PATENT DOCUMENTS

| | | |
|---|---|---|
| 2,484,248 | 10/1949 | Roehrl . |
| 3,057,573 | 10/1962 | Kindig et al. . |
| 3,288,389 | 11/1966 | Gersch et al. . |
| 3,383,064 | 5/1968 | Daly et al. . |
| 3,567,147 | 3/1971 | Engelsmann et al. . |
| 3,643,889 | 2/1972 | Krause . |
| 3,748,715 | 7/1973 | Hoover et al. . |
| 3,850,381 | 11/1974 | Moore . |
| 3,925,798 | 12/1975 | Sanada et al. . |
| 3,930,296 | 1/1976 | Hoover . |
| 3,999,197 | 12/1976 | Iwashita et al. . |
| 4,102,512 | 7/1978 | Lewallyn . |
| 4,171,892 | 10/1979 | Kozuki et al. . |
| 4,205,436 | 6/1980 | Klotz et al. . |
| 4,228,579 | 10/1980 | Dunkel et al. . |
| 4,251,148 | 2/1981 | Stemme et al. . |
| 4,256,269 | 3/1981 | Feighery et al. . |
| 4,274,726 | 6/1981 | Yoneyama et al. . |
| 4,303,325 | 12/1981 | Seely . |
| 4,342,509 | 8/1982 | Wakabayashi et al. . |
| 4,451,011 | 5/1984 | Engelsmann et al. . |
| 4,455,074 | 6/1984 | Wong et al. . |
| 4,687,311 | 8/1987 | Desormeaux . |
| 4,699,489 | 10/1987 | Nii . |
| 4,833,495 | 5/1989 | Ohmura et al. . |
| 4,838,497 | 6/1989 | Kramer et al. . |
| 4,884,087 | 11/1989 | Mochida et al. . |
| 4,890,130 | 12/1989 | Takei et al. . |
| 4,954,857 | 9/1990 | Mochida et al. . |
| 4,965,616 | 10/1990 | Horiuchi . |
| 4,972,649 | 11/1990 | Mochida et al. . |
| 5,016,833 | 5/1991 | Hamlin . |
| 5,049,908 | 9/1991 | Murakami . |
| 5,063,400 | 11/1991 | Takei et al. . |
| 5,125,630 | 6/1992 | Hoyt et al. . |
| 5,131,592 | 7/1992 | Shibata et al. . |
| 5,257,748 | 11/1993 | Morizzo . |
| 5,301,892 | 4/1994 | Merz et al. . |
| 5,311,231 | 5/1994 | Suzuki et al. . |
| 5,544,833 | 8/1996 | Zander . |
| 5,608,482 | 3/1997 | Watkins et al. . |

THREE ROLLER FILM WINDER AND METHOD

FIELD OF THE INVENTION

The invention relates to photographic equipment and more particularly relates to methods and apparatus for loading film in a camera body or body subassembly.

BACKGROUND OF THE INVENTION

Single use cameras are commonly sold preloaded with a cartridge of film. In order reduce complexity and costs, a rewind mechanism is omitted from the camera. Instead, the film is prewound and during use is advanced back into the film canister. A number of approaches have been followed in loading and prewinding film cartridges for single use cameras. In some approaches, such as one taught in U.S. Pat. No. 4,972,649; film is prewound into a roll outside the camera body and then loaded. A shortcoming of these approaches is that the film roll must be handled after it is formed. This presents a risk of film damage and may add complexity to necessary equipment. In some other approaches, also taught in U.S. Pat. No. 4,972,649; the cartridge is loaded, the camera is light-tightly closed, and the film is then prewound. In still other approaches, such as taught by U.S. Pat. No. 5,311,231; the cartridge is loaded and then the rear opening of the camera body is closed and the film is prewound through a bottom opening, which is later sealed. The latter two approaches have the shortcoming that film guiding is provided primarily by the camera body, rather than loading apparatus. This places constraints on the camera body in terms of required tolerances and the like and may, in addition, slow throughput circumferential speeds. Still another approach is taught by Japanese Kokai 6-295022, European Patent Application No. 0743546-A, and Japanese Kokai 8-171180. In this approach, the film is wound onto a second spool, rather than being wound into a film roll. The back of the camera is not mandatory for guiding the film, since the second spool tends to restrain the film.

A common feature of the above in-camera film winding procedures is the use of an axial winding support, onto which the film is cinched prior to winding. In some cases the support is a removable quill or mandrel. In the other cases, the support is a spool that is retained in the camera, rather than being removed. The quill has the shortcoming that the film must be decinched, i.e., released from the quill, prior to removal of the quill. The spool avoids this problem, but has the shortcoming of requiring an additional part. With inexpensive cameras, this is a significant expense. On the other hand, axial film winding with a quill or spool provides a positive connection to the film that avoids film slippage and the attendant risks of film scuffing or incomplete film loading or both.

Procedures are known for winding materials between multiple rollers and without an inside mandrel or other element. U.S. Pat. Nos. 3,850,381 and 4,102,512 teach the formation of a scroll of carpet or other sheet material between multiple rollers that retract as the scroll forms. U.S. Pat. No. 4,256,269 teach a carpet scrollers having three opposed rollers. Two of the rollers retract as the scroll forms, while a third is fixed. One of the rollers operates at a higher circumferential speed than the other two. A belt supplies the carpet to the rollers. This device is particularly directed to use with high bulk yarn carpets.

U.S. Pat. No. 3,057,573 teaches a camera having scroll chamber defined by three opposed rollers, which resiliently move apart as the scroll diameter is increased. One of the rollers is fixed. The other two are mounted in a movable carrier. The rollers are permanently mounted in the camera and with supports and resilient elements occupy a relatively large amount of space in the camera.

It would thus be desirable to provide an apparatus and method in which film is wound into a scroll within a camera chamber and film slippage is substantially avoided, using only elements external to the film scroll. It would also be desirable to limit the size of the camera chamber to only slightly larger than the film scroll produced.

SUMMARY OF THE INVENTION

The invention is defined by the claims. The invention, in its broader aspects, provides a three roller film winder and method for loading photographic film. In the method, a film cartridge is positioned in a cartridge chamber of a camera frame assembly. The camera frame assembly has the cartridge chamber, a supply chamber, and an intermediate section between the chambers. The film cartridge includes a spool and a filmstrip. The filmstrip has leading, main, and tail portions. A sleeve is introduced into the supply chamber. An upper roller is disposed over the sleeve. A pair of lower rollers are introduced into the supply chamber. The upper and lower rollers together define a substantially cylindrical scroll space. The leading portion of the filmstrip is advanced out of the cartridge and into the sleeve. The leading portion is curled within the sleeve and scroll space into an initial filmstrip scroll having at least one turn. The sleeve is retracted after the curling step. The main portion of the filmstrip is propelled between the upper and lower rollers to wind the main portion over the initial scroll. During the propelling, the spatial separation of the lower rollers from the upper roller is increased. This increases the diameter of the scroll space. The rollers are removed and the camera frame assembly is light-tightly closed.

It is an advantageous effect of at least some of the embodiments of the invention that an apparatus and method is provided in which film in wound into a scroll within a camera chamber and film slippage is substantially avoided, using only elements external to the film scroll. The size of the camera chamber is limited to only slightly larger than the film scroll produced.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
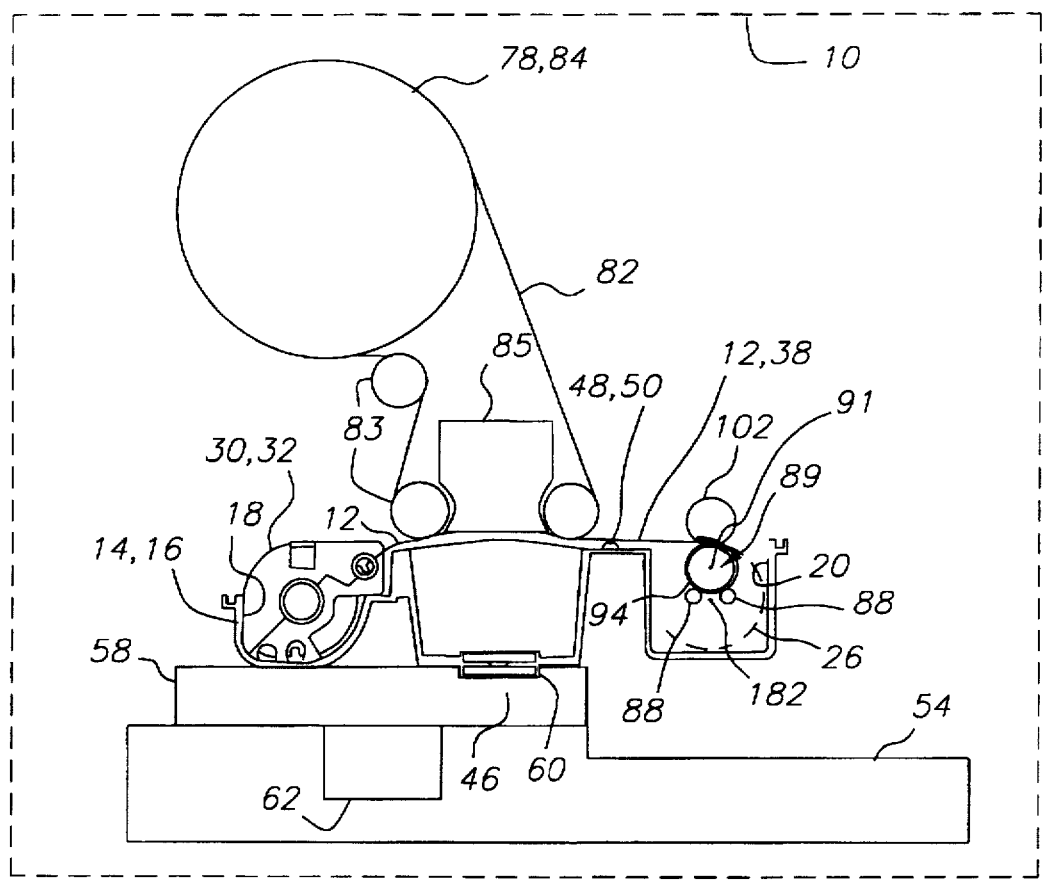
FIG. 1 is a semi-diagrammatical view of an embodiment of the apparatus of the invention, showing a receiver and film bridge. A pallet rests on the receiver. The pallet bears a camera frame assembly (shown in cross-section) and a cartridge. The film space is indicated by dashed lines. The film space axis is indicated by a cross. The invention is not limited to a particular camera frame assembly and various alternative camera frame assemblies are illustrated in the figures.

Referring initially to FIGS. 1–6, in the apparatus 10 of the invention, a filmstrip 12 is prewound in a camera frame assembly 14, that is, a camera or incomplete camera subunit, in a darkroom. The camera frame assembly 14 includes a camera frame 16 having a cartridge chamber 18 and a supply chamber or scroll chamber 20. The cartridge and supply chambers 18,20 each have a rearwardly facing throat or opening 15,17, respectively. The supply chamber 20 has an end opening 19 that is continuous with the throat 17. Opposite the end opening 19 is a second end opening or an end wall 21. The camera frame 16 has an intermediate section or exposure frame 22 between the chambers 18,20. The supply chamber 20 has a concave interior wall 24 that defines a substantially cylindrical, internal film space 26. The frame assembly 10 lacks a film spool or other axial film support, thus the films space 26 is empty, and remains empty after loading, except for the film roll. The frame assembly 10 defines a rear opening or rear accessway (indicated by dashed line 28 in FIG. 2) over the supply chamber 20 and, preferably over both chambers 18,20 and the intermediate section 22.

A film cartridge 30 loaded into the frame assembly 14 includes a canister 32, a spool 34, and the filmstrip 12. The filmstrip 12 has a leading portion 38 having a free end 40, a tail portion or trailing portion 42, which is attached to the spool 34 in the canister 32, and a main portion 44 between the leading and tail portions 38,42.

The camera frame assembly 14 can also include other camera components which have been previously installed on the camera frame 16. For example, the camera frame assembly 14 can include an exposure system 46, including one or more sub-components such as a baffle, a lens system, and a shutter. The frame assembly 14 can include a camera film drive 48 having a film engagement member (indicated diagrammatically in FIG. 2 by a semicircle 50) which adjoins the intermediate section 22 and engages film perforations (not shown) for film metering or both film metering and film transport. A variety of such camera film drives are well known to those of skill in the art. In such drives, the film engagement member can be a linearly reciprocated pawl; however, a sprocket is more commonly used as the film engagement member. In many film drives for type 135 (35 mm.) film, the sprocket is a continuously toothed wheel. The sprocket rotates with film movement; but, at all times, part of the sprocket extends rearward from the intermediate section. In some film drives for APS film, for example, in Japanese Kokai 7-5526, filed Jun. 14, 1993, the film engagement member is a skater or incompletely toothed sprocket in which an oval wheel has a pair of teeth at each end of the long axis and a toothless portion at each end of the short axis. With some film transport mechanisms, such as conventional sprocket types, it is necessary to lift film above the sprocket or other film engagement member during prewinding. With other film transport mechanisms, such as some skater types, the film can move past the skater or other film engagement member without causing it to rotate or otherwise actuate. The apparatus and method of the invention, in different embodiments, can accommodate either type of film transport mechanism.

Figure 4:
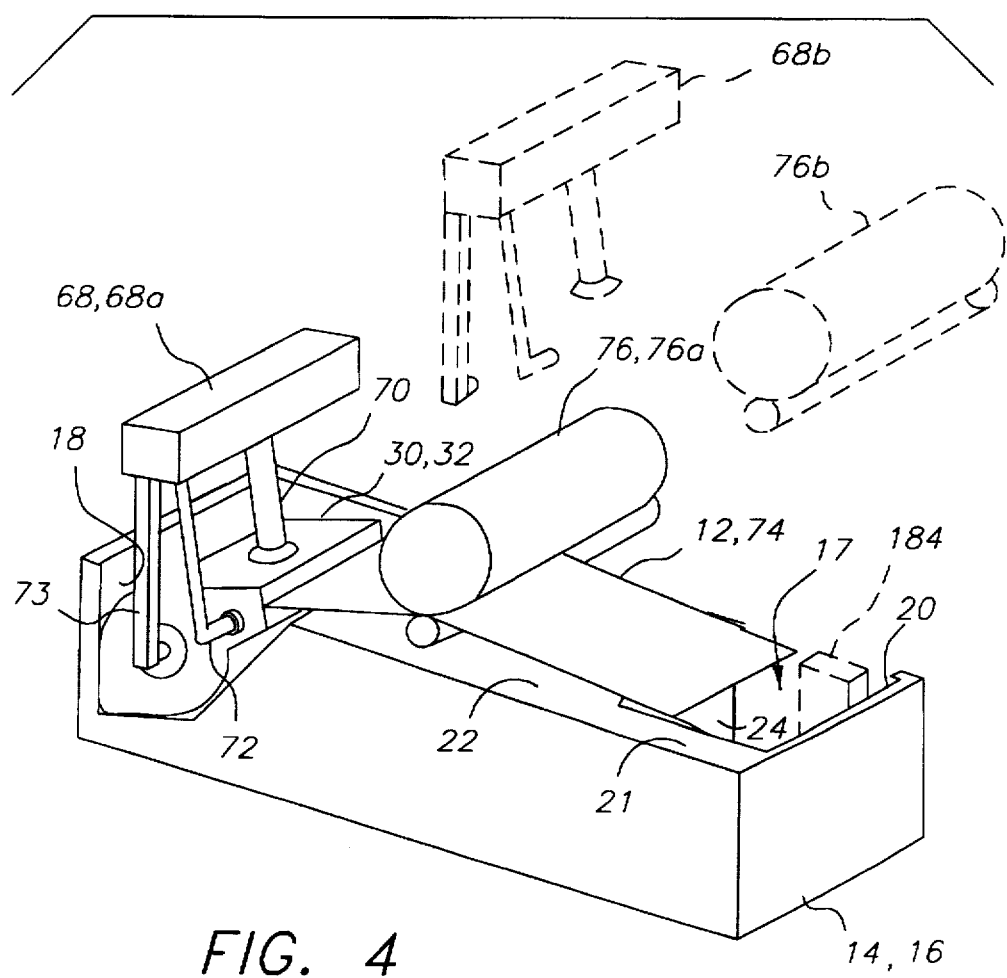
FIG. 4 is a semi-diagrammatical perspective view of still another embodiment of the apparatus and camera assembly of the invention. For clarity, the receiver and film scroller are not shown and the bottom of the cartridge chamber has been deleted. The film bridge and cartridge mover are shown in a use position in solid lines and in a rest position in dashed lines.

The apparatus 10 of the invention includes a receiver 54, and active components 56 for cartridge loading, film transporting, and film scrolling. The receiver 54 supports the camera frame assembly 14 in a predetermined loading position 14a or series of positions 14a relative to the active components 56. The receiver 54 has a predetermined relationship to other components 56 and thus, during assembly, defines a predetermined relative location or site for each of the chambers, throats, intermediate section 22, films space 26, and rear opening 28. (Sites correspond to features of the frame assembly and are necessarily predetermined for a particular frame assembly by adjusting physical constraints such as relative positions of the receiver 54 and other components 56 of the apparatus 10. In FIG. 4, representative sites are indicated in dashed lines and by references numbers identical to those of similarly named frame assembly features, but with the letter "a" added.) The receiver 54 can accept the camera frame assembly 14 directly or can be adapted to accept a pallet or nest 58 or the like. In that case, the camera frame assembly 14 is held in a predetermined relation to the pallet 58, which in turn in held in a predetermined loading orientation by the receiver 54. Indexing features 60 can be provided on the pallet 58 to permit the camera frame assembly 14 and the receiver 54 to be readily aligned. The frame assembly 14 can be provided to the receiver 54 premounted on a pallet 58 or the pallet 58 and frame assembly can combined on the receiver 54.

Figure 5:
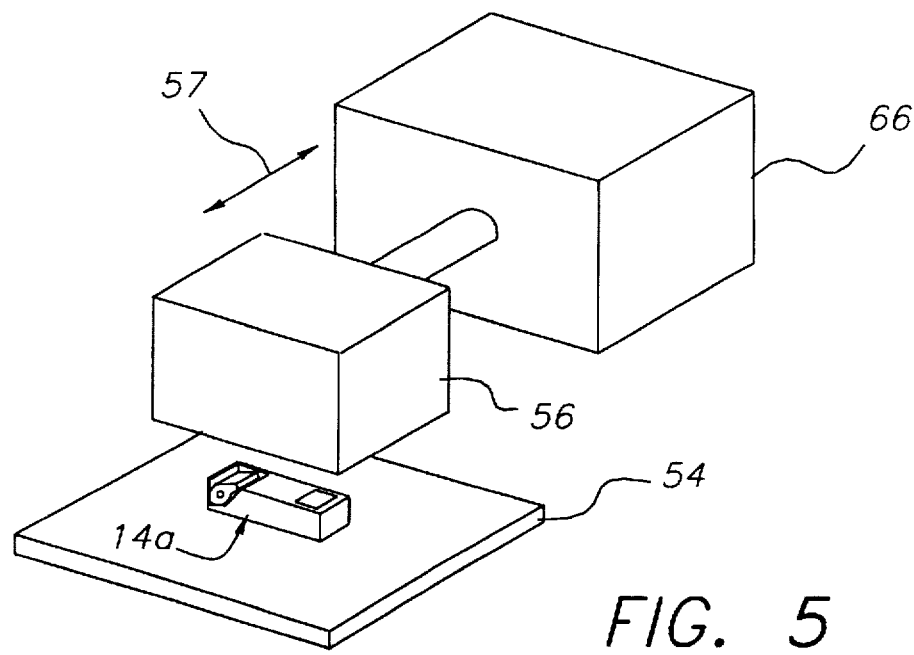
FIG. 5 is a semi-diagrammatical perspective view of another embodiment of the apparatus of the invention.

The receiver 54 can have a variety of features for supporting automated assembly operations. For example, the receiver 54 can include a movement system or positioner 62, for moving a camera frame assembly 14 between the apparatus 10 of the invention and one or more other assembly stations 64 or between stations 64 having different components 56 of the apparatus 10 of the invention. For example, in FIG. 1, the positioner 62 (illustrated schematically) can be a conveyor or track for moving the camera frame assembly 14 in directions perpendicular to the plane of the figure. The apparatus components 56 can each include an actuation mechanism 66 such as a retraction-extension unit to allow the component 56 to extend to an active position for use and to retract to a store position clear of the movement system 62 between actuations. (Directions of movement for one component 56 are indicated in FIG. 5, by double-headed arrow 57.) The actuation mechanism 66 can also include other parts for imparting motion to components 56, such as rotary or linear drives. As a matter of convenience, the following discussion generally treats the receiver 54 as being static relative to other components 56 of the apparatus 10 of the invention.

Referring now primarily to FIG. 4, the apparatus 10 can include a cartridge mover 68 for positioning the cartridge 30 in the cartridge chamber site. The cartridge mover 68 can be simply a pick and place mechanism or can provide additional functions. In the embodiment of the invention shown in FIG. 3, the cartridge mover 68 has a vacuum gripper 70 which allows the cartridge mover 68 to position the cartridge 30 in the site of the cartridge chamber 18. The vacuum gripper 70 or a holddown (not shown) can be used to retain the cartridge 30 in the cartridge chamber 18 during film winding, if the camera frame assembly 14 lacks features to prevent oscillation or other movement. In this embodiment, the cartridge mover 68 also supports an active light lock opener 72 and a spool rotator 73. The active light lock opener 72 pivots to open the active light lock of a suitable film cartridge 30, such as an Advanced Photo System™ (APS™) cartridge, prior to placement of the cartridge in the cartridge chamber site. This allows the camera frame assembly 14 to include a detent (not shown) which retains the active light lock in the open position prior to cartridge removal for processing. The spool rotator 73 engages the spool of the APS cartridge and rotates the spool to thrust film from the cartridge.

The apparatus 10 defines a film path 74 extending from the site of the cartridge chamber 18 to the site of the supply chamber 20. (In FIGS. 1–2, 4, the film path 74 is occupied by the filmstrip 12; and a film bridge 76 is disposed over the intermediate section 22 and defines parts of the film path 74.) The apparatus 10 has a film transport 78, disposed in operative relation to the film path 74, to propel the filmstrip 12 along the film path 74 to the supply chamber 20. The film transport 78 can use a driven roller, or belt, or other conventional film transport device (not separately illustrated) to move the film along the film path 74. With a thrust-type film cartridge, a spool rotator, like that previously discussed, can also be utilized.

The use of a film bridge 76 is preferred in embodiments of the invention in which the camera film drive 48 has a film engagement member 50, such as a conventional sprocket, that continually extends into the intermediate section 22. The film bridge 76 causes the film path 74 to be spaced apart from the intermediate section 22 site and separates the filmstrip 12 from the camera film drive 48, which thus does not need to be disabled or the like during scroll formation. In some other embodiments, the film engagement member 50 of the camera film drive 48, is a skater or the like and can be positioned so as to not extend into the intermediate section 22 during film winding. In these embodiments the use of a film bridge 76 is not mandatory, since film winding through the intermediate section 22 will pass freely over the film engagement member 50. A frame assembly having film retention fingers can be used. Such a frame assembly is disclosed in U.S. patent application Ser. No. 08/796,155, entitled "ONE-TIME-USE CAMERA HAVING MAIN BODY PART AND INSERTABLE LIGHT BAFFLE WITH FILM HOLDERS TO FACILITATE CAMERA ASSEMBLY", filed Feb. 6, 1997, by Douglas H. Pearson, which is hereby incorporated herein by reference. The film retention fingers define and guide the filmstrip along part of the film path: a film entrance leading into the supply chamber.

Figure 2:
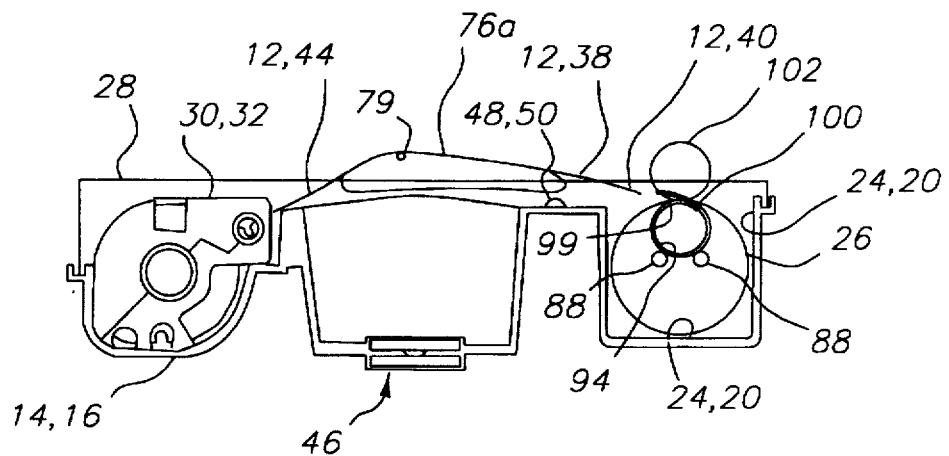
FIG. 2 is the same view of the camera frame assembly as shown in FIG. 1, but with the film bridge of an alternative embodiment of the invention.

The film bridge 76 can take a variety of forms. For example, the film bridge 76 can be a turtleback 76a as shown in FIG. 2. It is preferred that the turtleback 76a present minimal friction to the filmstrip 12. The turtleback can provide one or more friction reducing features (indicated by item 79 in FIG. 2); such as holes and a pressurized gas connection to create an air cushion or rotary bearings.

Figure 3:
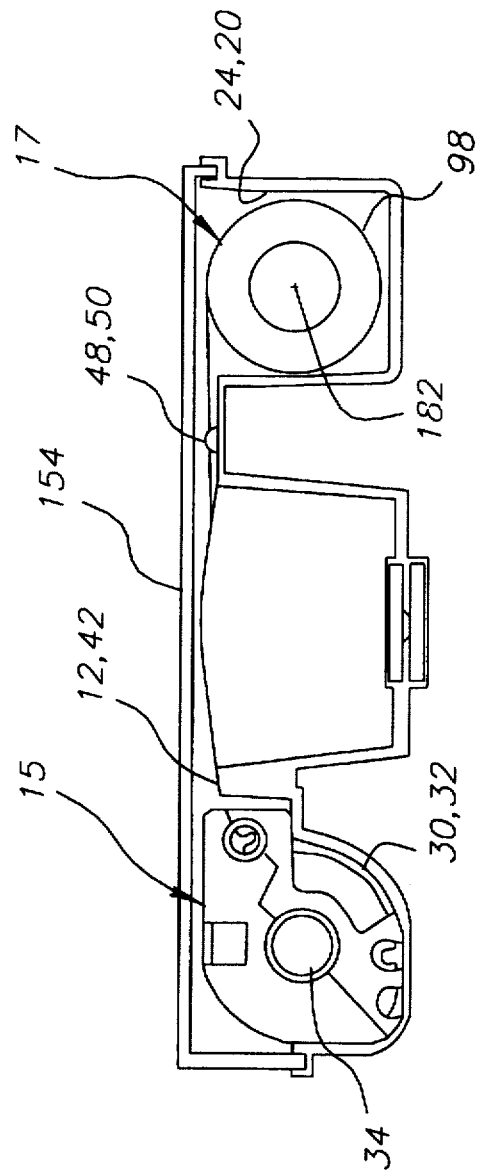
FIG. 3 is the same view of the camera frame assembly as shown in FIG. 2, after film scrolling and installation of the back cover closing the rear opening.

It is highly preferred that the film bridge 76 include the film transport 78 to propel the filmstrip 12 across the film bridge 76 to the supply chamber 20. Examples of film bridges 76 that include a film transport 78 include a capstan drive, as shown in FIG. 3; a vacuum shuttle, such as that disclosed in U.S. Pat. No. 5,125,630; and an endless belt mechanism, as shown in FIG. 1. The endless belt 82 can be disposed between the filmstrip 12 and the intermediate section 22 of the camera frame assembly 14 or, as shown in FIG. 1 can overlie the filmstrip 12. The mechanism 42 includes a belt drive 84 and idlers 83 which position and tension the belt 82. An endless belt 82 overlying the filmstrip 12 can have holes (not shown) and include a vacuum-compressed gas unit 85 which provides a vacuum to pull the filmstrip 12 against the belt 82 for transport, and directs compressed gas against the filmstrip 12, or uses gravity to release the filmstrip 12 from the belt 82. The film bridge 76 can be permanently positioned relative to the receiver 54 or a positioner 62 can be provided for moving the film bridge 76 relative to the receiver 54, between a use position over the intermediate section site and a rest position spaced apart from the use position. A cartridge mover 68 or other component, such as a film bridge 76 can be repositioned in the same manner; between active and rest positions 68a,76a and 68b,76b, respectively.

Referring now primarily to FIGS. 1, 2, and 7–13d; a scroll former 86 scrolls the filmstrip. The scroll former 86 has several parts (discussed below) that can be commonly mounted to a support 87, which can be mounted so as to move between a use position and a rest position in the same manner as the film bridge 76 and cartridge mover 68, either with the other components 56 or independently. The scroll former 86 includes a pair of lower rollers 88 which have longitudinal axes of rotation 90. The lower rollers 88 are mounted to an lower rollers drive 92 that rotates the lower rollers 88 about the axis of rotation 90. The lower rollers 88 are movable between a rest position outside the supply chamber 20 and a use position inside the supply chamber 20. The lower rollers 88 are connected to a locator or actuation mechanism 66 that is a linear actuator or the like for movement of the lower rollers 88 between the two positions. It is preferred that the movement of the lower rollers 88 are in directions parallel to the axes of rotation 90 of the lower rollers 88, since this minimizes the space needed in the supply chamber 20. In particular embodiments of the invention, the locator also provides for movement of the lower rollers 88 deeper into the supply chamber 20 during scrolling. Suitable drives, linear actuators and the like for the locator 66 and for mechanisms for movement of the lower rollers 88 and other parts of the scroll former 86 are well known to those of skill in the art.

The size and shape of the supply chamber 20 is a function of the final film scroll 98 and the space necessary to accommodate the lower rollers 88, at the conclusion of scrolling, exterior to the film scroll 98 and within the supply chamber 20. The size of lower rollers 88 is not critical; however, excessively large diameter rollers would unnecessarily enlarge the supply chamber and excessively small diameter rollers would lead to a risk of scuffing due to their high circumferential speed. A convenient size for the lower rollers 88 is a diameter that will fit, without interference, in a supply chamber 20 having a roughly square cross-section with an edge length about the same as the diameter of the film space 26. A convenient lower rollers 88 diameter in this embodiment is from about 3 to about 4 mm.

The scroll former 86 includes a sleeve 94 that is mounted to a locator or linear actuator 66 for movement, independent of the lower rollers 88, between a first position outside the supply chamber 20 and a second position inside the supply chamber 20 and spaced apart from the interior wall 24. The movement of the sleeve 94 as it is introduced and withdrawn from the supply chamber 20 is in directions parallel to the lower roller axes 90. During filmstrip scrolling, the sleeve 94 receives the free end 40 of the leading portion 38 of the filmstrip 12 and directs the free end 40 along a cylindrical path. The sleeve 94 can be a single piece or multiple pieces, but it is preferred that the sleeve 94 is configured such that the free end 40 of the filmstrip 12 is unlikely to catch or snag. The sleeve 94 preferably has a smooth or other low friction inner surface and the sleeve 94 can be configured to contact only part of the width of the filmstrip 12. A convenient shape for the sleeve 94 is that of a coil having a single turn and an outer margin 99 overlapping an inner margin 100 or an incomplete coil in which the outer and inner margins 99,100 are closely spaced, but do not overlap. In a particular embodiment of the invention, outer margin 99 has a pair of opposed elongated outer ears 101 that extend upward and outward from the rest of the outer margin 99 of the sleeve 94 and a pair of inner ears 103 that extend downward and inward from the inner margin 100. In this embodiment, the ears 101,103 overlap; but the margins 99,100 do not. The ears 101,103 are positioned to only contact the edges 117 of the filmstrip 12 and help initially guide the free end 40 into the sleeve 94. The outer ears can also help separate the filmstrip 12 from a vacuum belt or other film bridge 76. The outer ears 101 can be separate pieces from the sleeve 94.

The sleeve 94 encircles a curling space 89 that is preferably almost circular in cross-section, but can be slightly oval. The curling space has a central sleeve axis or curling axis 91 that is internal to the supply chamber 20 and parallel to the lower roller axes 90. The curling space 89 has an upwardly positioned opening or gap 105 bordered and defined by the margins 99,100 and ears 101,103. The size of the curling space 89 is directly related to the size of the final film scroll 98. It is therefore necessary that the curling space 89 be sized to permit formation of a final film scroll 98 of a desired size. In a particular embodiment of the invention, the curling space 89 is about 10 mm in diameter and the final scroll diameter is about 16 mm. A convenient curling space 89 in that embodiment is about 10 mm (± about 1 mm).

The scroll former 86 includes an upper roller 102. The upper roller 102 is mounted to a locator 66 for movement between a rest position in spaced relation to the supply chamber 20 and a use position in which the upper roller 102 is disposed over the sleeve 94 and lower rollers 88 (when the sleeve 94 and lower rollers 88 are also positioned for use). In the use position, the upper roller 102 is substantially tangent to the throat 17 of the supply chamber 20 and substantially parallel to the lower rollers 88, and the lower and upper rollers 88,102 are spaced apart by and define a scroll space 80. The upper roller 102 is lightly biased toward the scroll space 80, by as biaser 106, so that the upper roller bears against the forming film scroll 104. The biaser is illustrated schematically in FIG. 7, and can be a resilient band or spring or suspended weight, or the like.

The upper roller 102 can be a unitary piece or can have multiple segments 110. The segments 110 can rotate about different axes; however, it is highly preferred that all segments 110 rotate about a common axis 108, since this reduces the risk of telescoping and wobbling. In the embodiment shown in the figures, the upper roller 102 has two roller segments 110 that are mounted to a common pivot arm 112 and rotate about a common axis 108. The segments 110 extend into gap 105, between the members of each pair of ears 101,103 of the sleeve 94 and margins 99,100.

The pivot arm 112 includes an appropriately positioned biaser 106 to urge the upper roller 102 toward the lower rollers 88. The pivot arm 112 is convenient, but could be replaced by an equally convenient support providing linear, rather than pivoting movement of the upper roller 102 against a biasing force. The biasing force applied by the biaser 106 is selected so that the friction between the turns of filmstrip 12 is sufficient to wind the film scroll 104 without substantial slippage and insufficient to crush or otherwise distort the scroll. One or both segments of the upper roller 102 can have a radially extending end flange (not shown) positioned to closely receive the edges of the filmstrip 12 with a separation only slightly larger than the transverse dimension (not shown) of the filmstrip 12. Such flanges restrict telescoping or other lateral movement of the firm scroll during formation.

It is preferred that both lower and upper rollers 88,102 are centrally relieved or otherwise reduced in cross-sectional area toward the center and thus only grip the edges 117 of the filmstrip during film scrolling. This eliminates or largely curtails contact with the image area of the filmstrip 12. It is preferred that both rollers 88,102 have substantially uniform contact with the filmstrip 12 on both edges 117, since this reduces the risk of telescoping and other filmstrip distortion. In the embodiment shown in the figures, each lower roller 88 is centrally relieved and has the configuration of a pair of radially enlarged segments 119 joined by a narrower shaft 121. The upper roller 102 is reduced to a pair of wheel-shaped segments 110. The materials, surface finishes, durometer, and other similar characteristics of the lower and upper rollers can be selected from those commonly used for photographic film transport rollers, well known to those of skill in the art.

The lower and upper rollers 88,102 are each driven. It is highly preferred that each segment of a segmented upper roller is driven at the same circumferential speed, that is, speed at the circumference of the roller, since a differential in circumferential speed between segments is likely to cause the filmstrip to scuff or telescope or otherwise distort or mistrack. The lower rollers 88 are rotated at a higher circumferential speed than the upper roller 102. It is highly preferred to limit the lower rollers 88 to a circumferential speed of less than about 10 percent in excess of the circumferential speed of the upper roller 102. In a particular embodiment of the invention, the lower rollers are driven at a circumferential speed about 1 to 2 percent faster than the circumferential speed of the upper rollers. The differential in circumferential speed causes the resulting final film scroll to be tighter than if the rollers 88,102 are driven at the same circumferential speed. The relationship of circumferential speed to rate of rotation is a function of the circumference of each roller. In the embodiment shown in FIGS. 7–12, the rate of rotation of the lower rollers 88 is slightly more than twice that of the upper roller 102 if both are rotated at an equal circumferential speed.

The manner of driving, moving, and supporting the rollers 88,102 is not critical. Rollers 88,102 can be directly driven by individual motors or can be connected to one or more motors by positive drive elements such as gear trains or sprockets and toothed belts or by elements that allow slippage, such as smooth belts and pulleys. In the embodiment of the invention shown in FIGS. 7–12, a belt 107 (illustrated as a line) driven by a motor 109, drives pulleys 158. The pulleys 158 are joined to shafts 160 that rotate in bearings 162 mounted in fixed positions on the support or frame 87. Adjoining the bearings 162 and pivotably mounted to the frame 87 are outside ends 164,166 of a pair of support arms 93 and a pivot arm 112, respectively. The pivot arm 112 has a pair of tines 169. Inside ends 168,170 of arm 93 and tines 169, respectively, have bearings 162 for lower rollers 88 and upper roller segments 110, respectively. Belts 172,174 are disposed over pulleys 158 joined to shafts 160 and respective rollers 88,102.

The support arms 93 are mounted so as to define two sides of an equilateral triangle. A horizontal line connecting the outside ends 164 of the support arms 93 would be the remaining side of the triangle. Connectors 176 are joined to support arms 93 and freely slidable over a range of positions. Link rod sections 178 of equal length are attached to the connectors 176 and a linear actuator 180. Movement of the linear actuator 180 in a vertical direction acts on the support arms 93 through the connectors 176 to move the lower rollers 88 in directions radial to a central axis 182 of the supply chamber 20.

The linear actuator 66 for the sleeve 94 is illustrated as introducing the sleeve 94 into the supply chamber 20 from the bottom of the supply chamber 20, while the lower rollers 88 and upper rollers 102 are introduced from the top. This requires that both ends of the supply chamber 20 be open. The lower and upper rollers 88,102, and sleeve 94 can instead all be introduced from the same side. In that case, the bottom of the supply chamber can be closed.

An elbow linkage 184 is fixed to the pivot arm 112 opposite the tines 169. The elbow linkage is joined to a linear actuator 186. The tines 169 are weighted and bias the upper roller in a downward direction. Movement of the linear actuator 186 in a vertical direction varies this biasing.

The method of the invention is particularly suitable for prewinding film in one time use cameras; but is also suitable for prewinding reusable cameras marketed ready for use, that is, with a preloaded, prewound film cartridge. In the method of the invention, a film cartridge 30 is loaded into the cartridge chamber 18 of the camera frame assembly 14. The filmstrip 12 remains attached at one end to a spool 34 in the cartridge. After scrolling (discussed in more detail below), the filmstrip 12 extends from the cartridge, across the intermediate section 22 to the supply chamber 20, and the main portion 44 of the filmstrip 12 is a scroll 98 resting in the supply chamber 20. The scroll 98 is cylindrical and defines a central axis 182.

Figure 14:
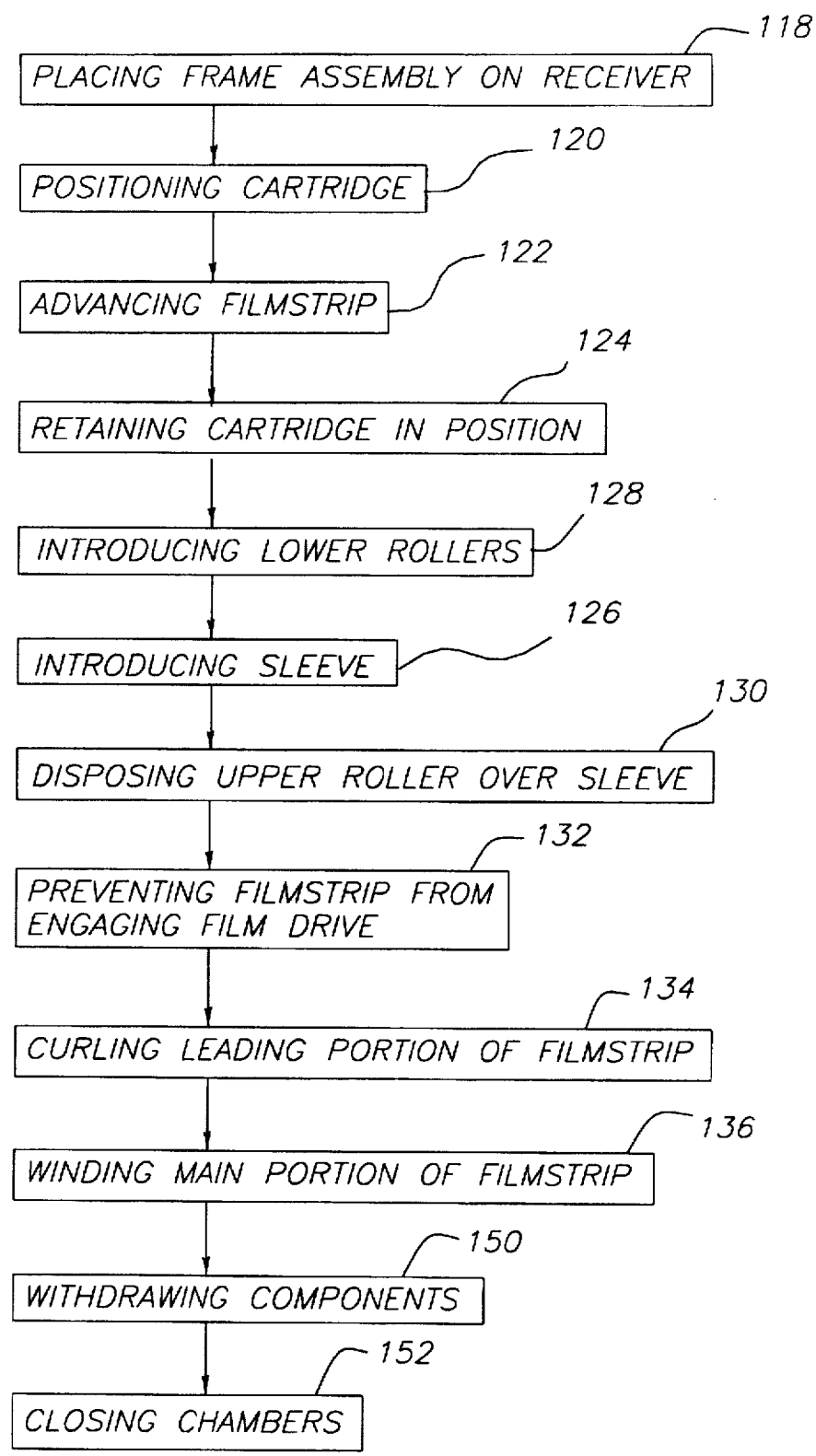
FIG. 14 is a flow chart of another embodiment of the method of the invention.

Referring now to the flow chart of FIG. 14 and the other figures generally, a camera frame assembly 14 is placed (118) on the receiver 54 of the apparatus 10 of the invention. The assembly 14 can be manufactured as a part of a continuous process with the method of the invention or can be manufactured in an independent process. As noted above, the camera frame assembly 14 can be premounted on a pallet 58. The camera frame assembly 14 can also be placed on a pallet 58 previously positioned on the receiver 54. After the frame assembly 14 has been placed on the receiver 54, a film cartridge 30 is positioned (120) in the cartridge chamber 18 of the frame assembly 14 and the filmstrip 12 is advanced (122) to the supply chamber 20.

Figure 6:
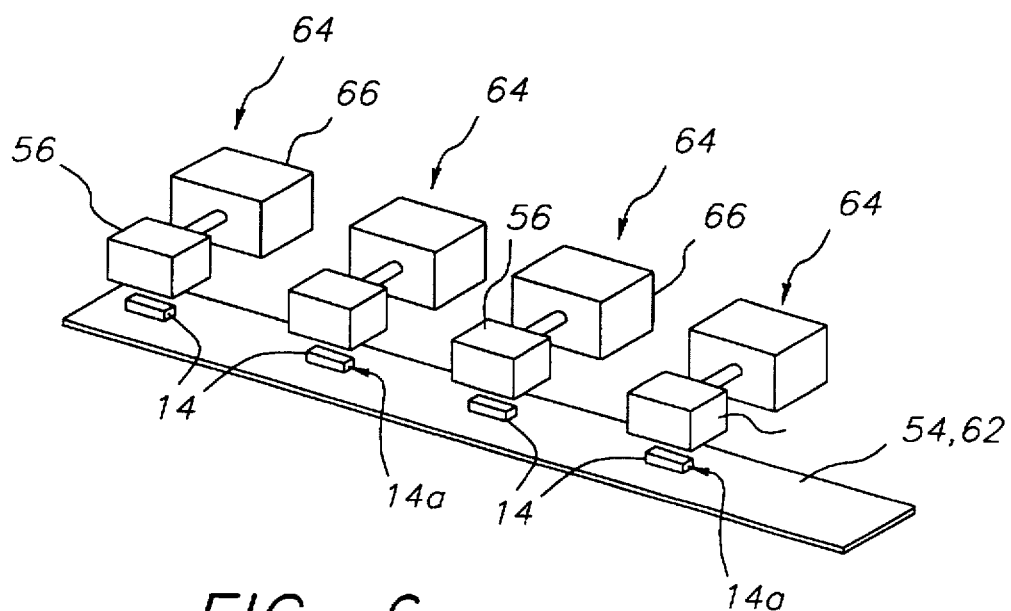
FIG. 6 is a semi-diagrammatical perspective view of still another embodiment of the apparatus of the invention.
Figure 7:
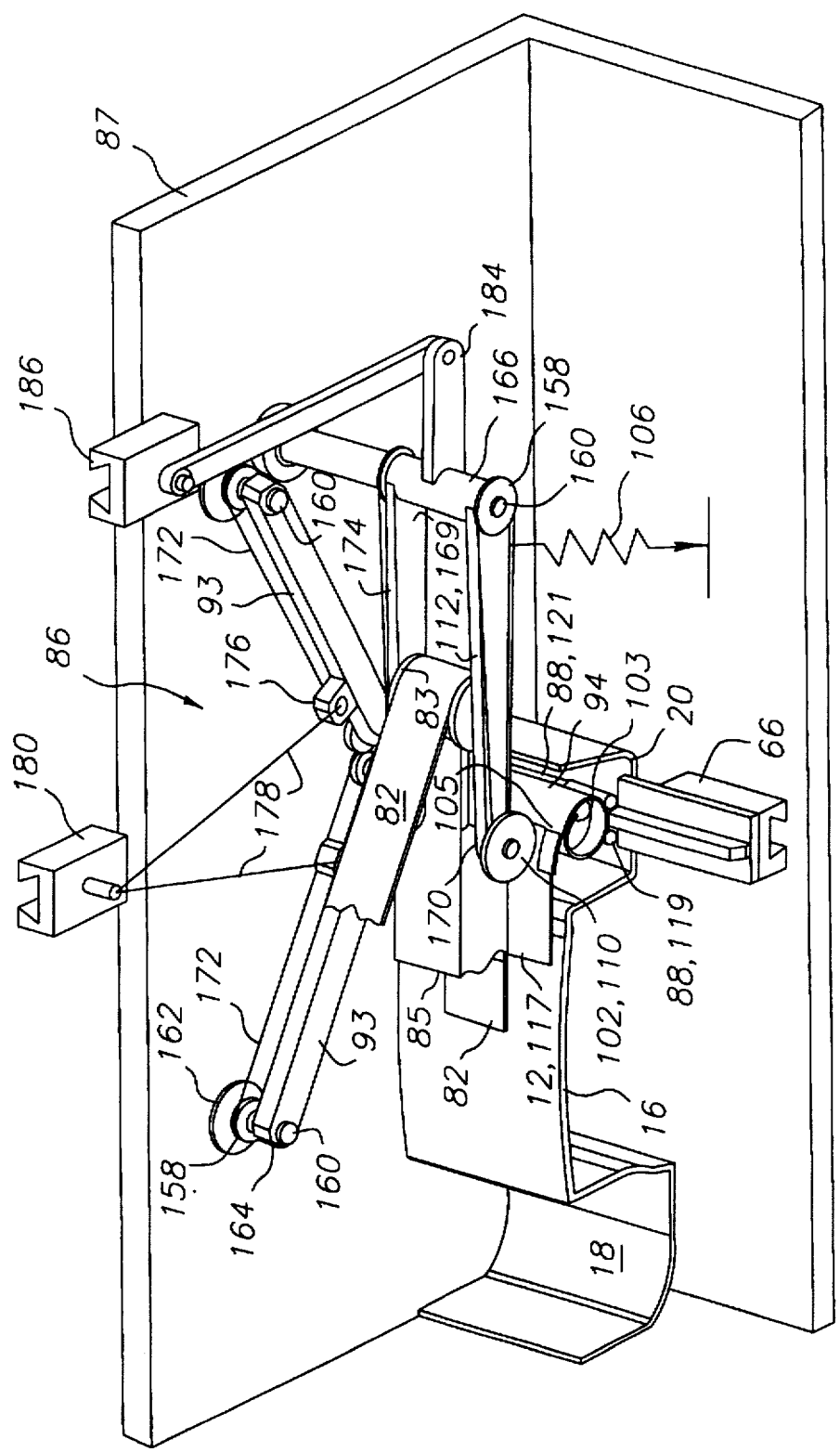
FIG. 7 is a semi-diagrammatical front perspective view of the apparatus of FIG. 1 and a camera frame assembly during curling of the leading portion of the filmstrip to form and initial scroll. For clarity, only part of the camera frame is shown and the cartridge and the filmstrip leading to the cartridge is also not shown.
Figure 8:
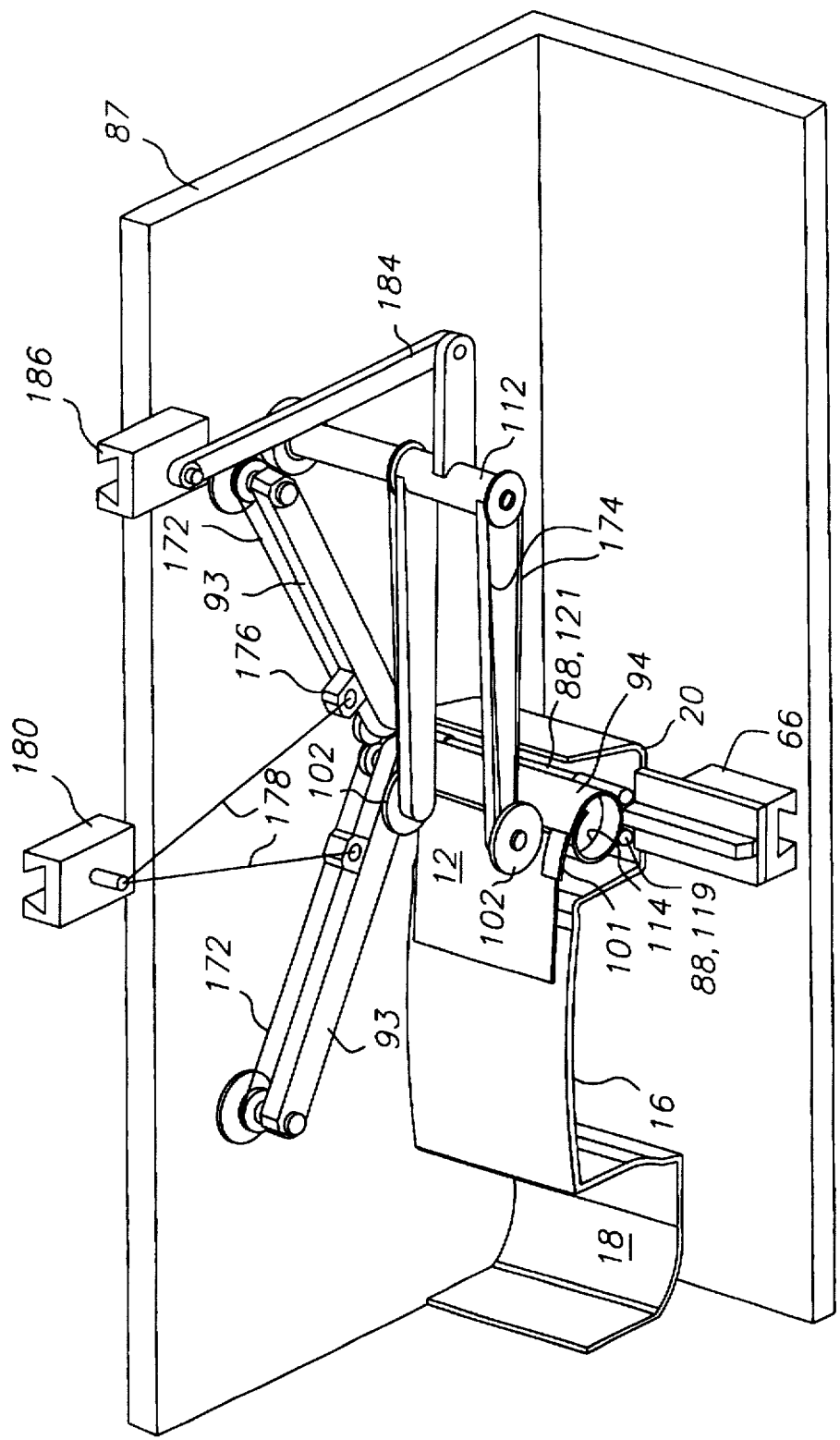
FIG. 8 is the same view as FIG. 7, but the film bridge is not shown.
Figure 9:
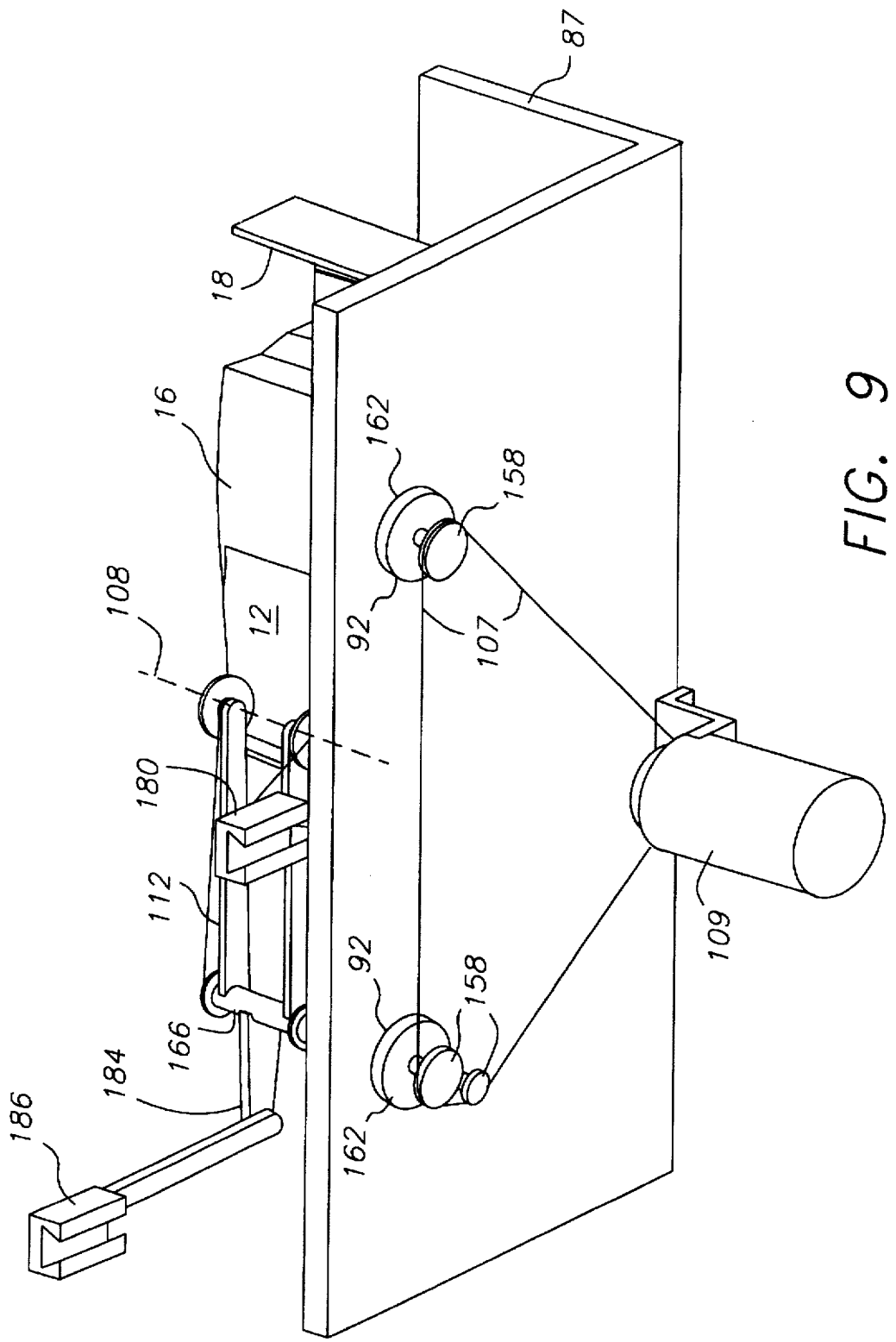
FIG. 9 is a semi-diagrammatical rear perspective view of the apparatus and a camera frame assembly of FIG. 7.
Figure 10:
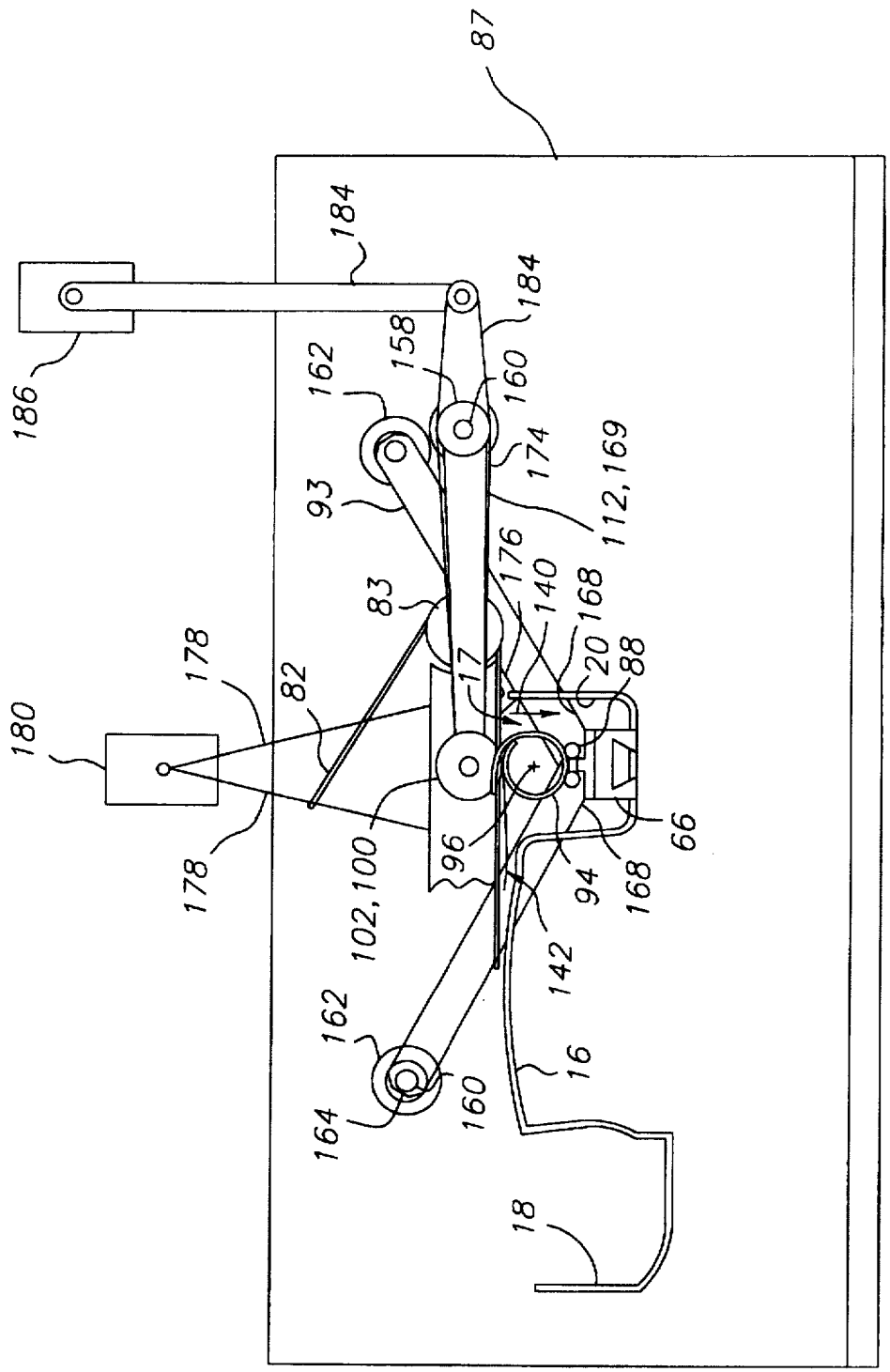
FIG. 10 is a side plan view of the apparatus and a camera frame assembly of FIG. 7.
Figure 11:
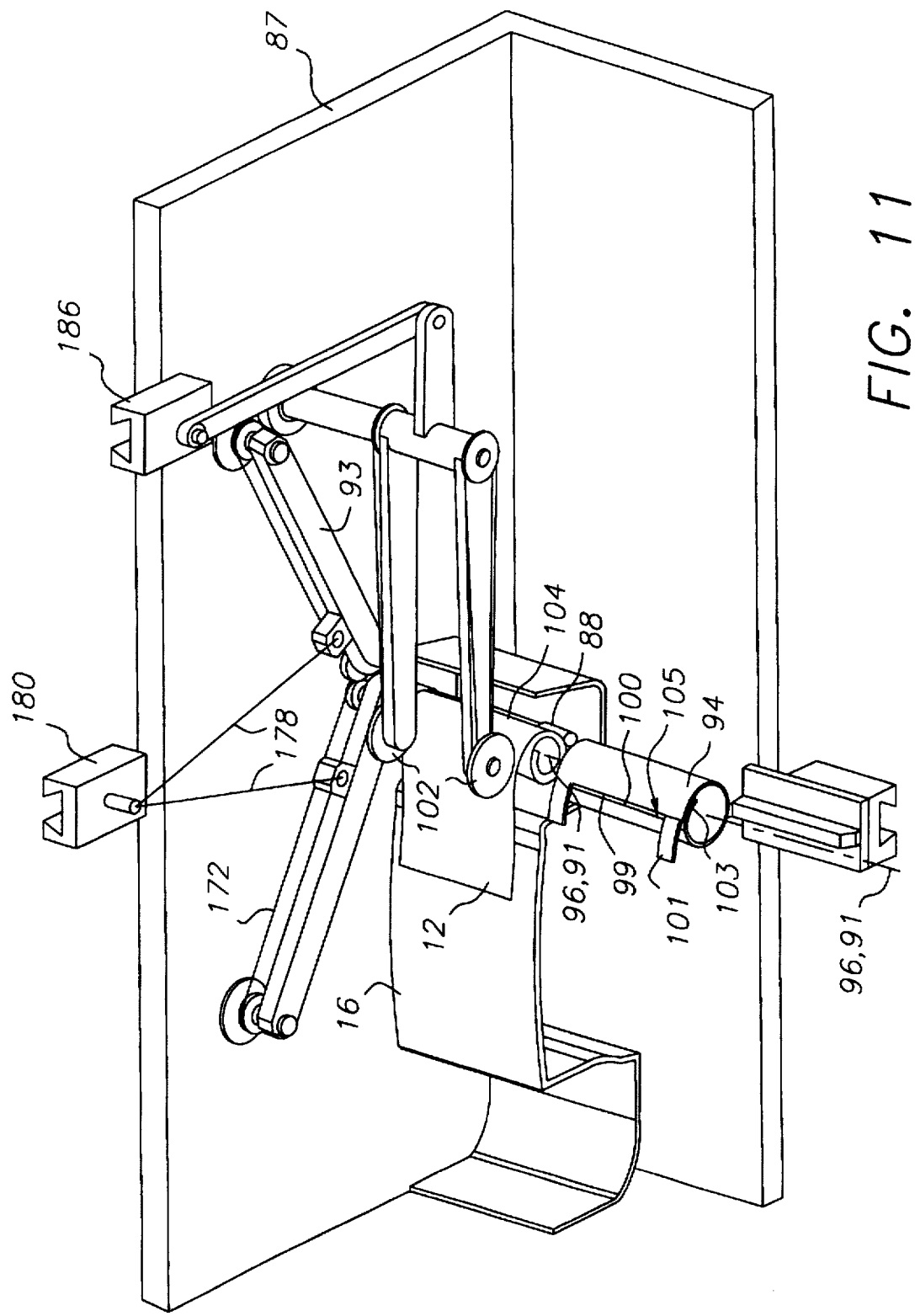
FIG. 11 is the same view of the apparatus and camera frame assembly as in FIG. 7, but after the completion of curling and withdrawal of the sleeve. The forming film scroll is shown in diagrammatical form.
Figure 12:
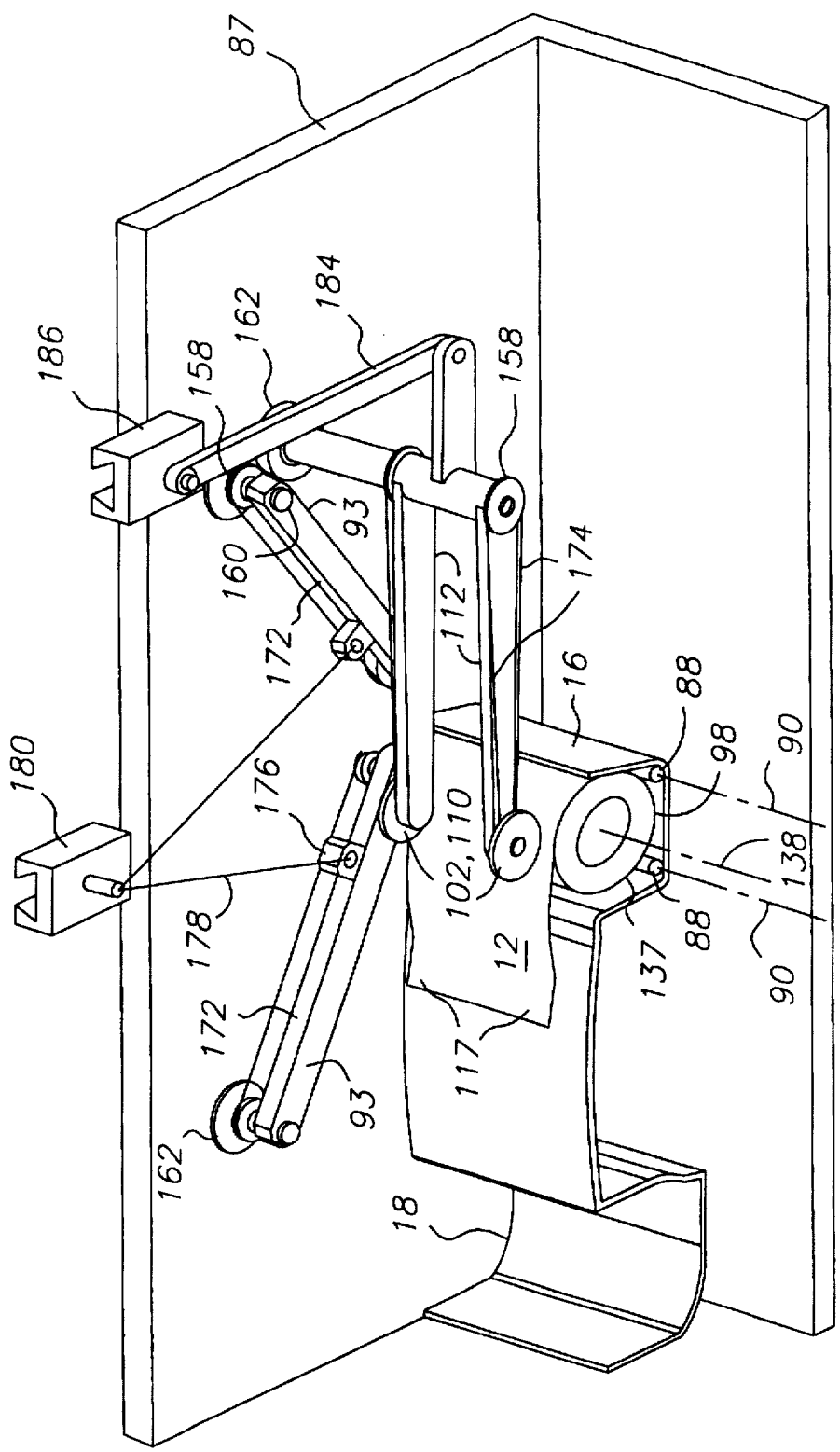
FIG. 12 is the same view of the apparatus and camera frame assembly as in FIGS. 7 and 11, but after the completion of winding of the film scroll.
Figure 13:
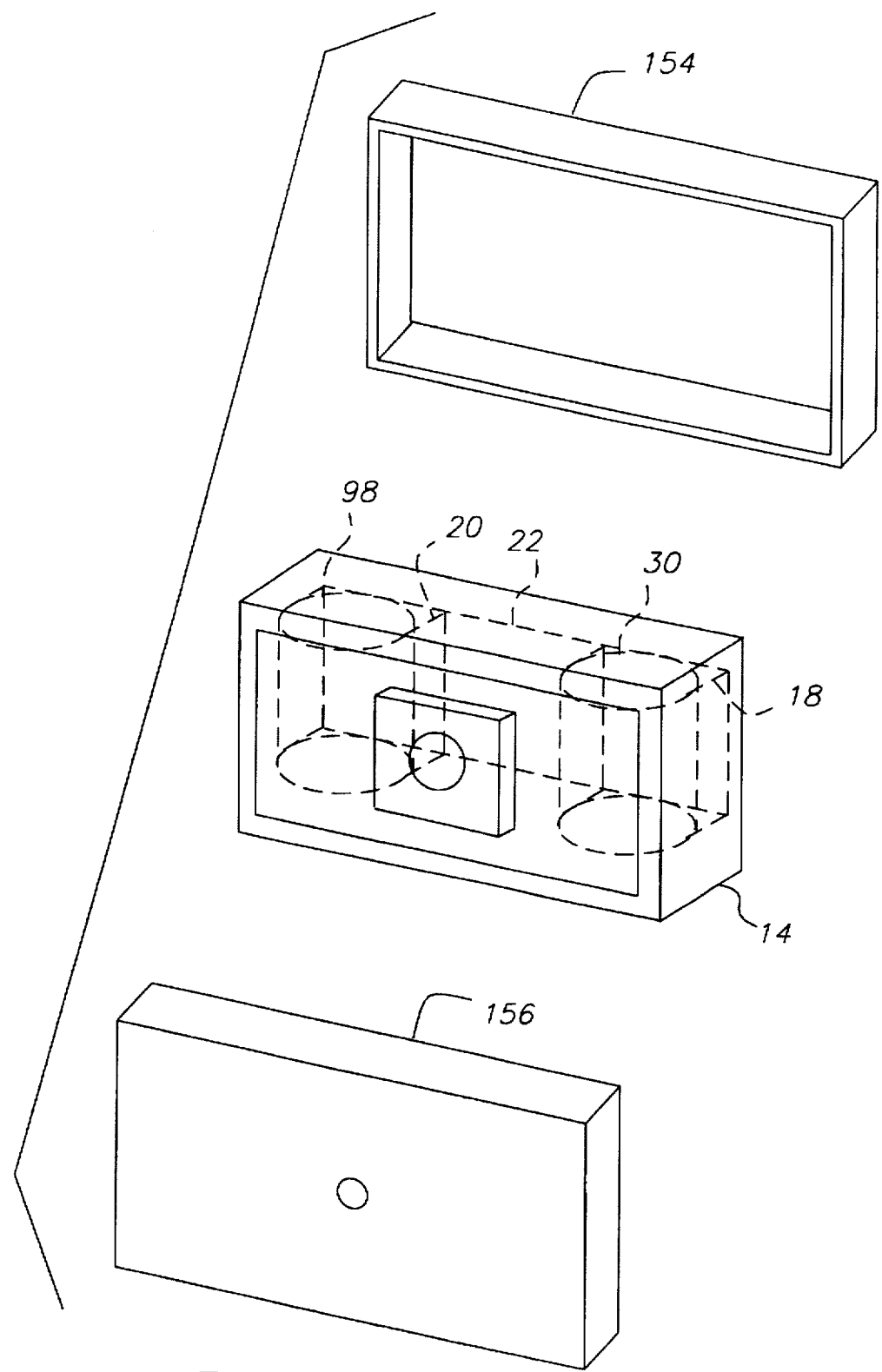
FIG. 13 is an exploded perspective view of a camera produced by an embodiment of the method of the invention.

In the embodiment of the invention also shown in FIG. 6, a film cartridge 30 is gripped and placed (120) in the cartridge chamber 18 of the camera frame assembly 14. The cartridge mover 68 can simply place a film cartridge 30 in the cartridge chamber 18 or can pick up a cartridge 30 from a supply (not shown), move the cartridge 30 to the cartridge chamber 18, and then continue to grip or otherwise retain (124) the cartridge 30 in position until film winding is completed. This is convenient if the camera frame assembly 14 lacks features to prevent oscillation or other movement of the film cartridge 30 during film winding. In a particular embodiment, the cartridge mover 68 has a vacuum gripper 70 to hold the cartridge. The cartridge mover 68 can support other components 56, such as an active light lock opener 72 and a spool rotator 82. The active light lock opener 72 is pivoted to open the active light lock of a suitable film cartridge 30, such as an Advanced Photo System™ (APS™) cartridge, prior to placement of the cartridge in the cartridge chamber site. This allows the camera frame assembly 14 to include a detent (not shown) which retains the active light lock in the open position during film use. The spool rotator 82 engages the spool 34 of the cartridge 30 and rotates the spool 34 to thrust the filmstrip 12 from the cartridge 30.

Next, the camera frame assembly 14 is moved into place relative to the scroll former 86 or is otherwise placed in a use condition relative to the camera frame assembly 14. Depending upon the film drive of the camera frame assembly 14, as discussed above, a film bridge 76 can be positioned over the intermediate section 22 of the frame 16. The filmstrip 12 is then advanced (122) by the film transport 78 from the cartridge 30 to the supply chamber 20 along the film path 74. In a particular embodiment of the invention, a film transport 78 has a quill that thrusts a filmstrip 12 out of the cartridge. The thrusting of the film can be continued until the free end 40 of the filmstrip 12 is impelled into the supply chamber 20. A detector 124 can be positioned to sense optically or in some other manner when the free end 40 reaches the film gap 80 and signal the controller (not shown) to stop thrusting. In other embodiments of the invention, the leading portion 38 of the filmstrip 12 is transported to the supply chamber 20 by the film bridge 76. In some embodiments, the film path 74 is spaced apart from the camera film drive 48 and, during film advancing, the filmstrip 12 is prevented (132) from engaging the film drive.

The sleeve 94 is next introduced (126) into the supply chamber 20 and the upper roller 102 is disposed (130) over the sleeve 94. The sleeve 94 is withdrawn (136) after curling (134). The lower and upper rollers 88,102 can be introduced (128) into the supply chamber 20 and disposed (130) at the throat 17, respectively, either at the same time as the sleeve 94 or separately; and before, during, or after curling (134) of the initial film scroll 114 in the sleeve 94; but are disposed in the supply chamber 20 in the immediate vicinity of the sleeve 94, prior to removal (150) of the sleeve 94. The lower and upper rollers 88,102 are placed in the supply chamber 20 so as to together define a scrolling space 97 that is substantially cylindrical and has a scrolling space axis 96 that is parallel to the lower and upper roller axes 90, 108 and the central axis 182 of the supply chamber 20. The axis 96 of the scrolling space 97 is preferably substantially coextensive with the curling axis 91 when the sleeve 94 is withdrawn.

In the embodiment of the invention shown in the drawings, the upper roller 102 is moved into place over the sleeve 94 prior to curling, since the upper roller 102 contacts the leading portion 38 of the filmstrip 12 during curling and helps push the leading portion of the filmstrip 12 into the sleeve 94. In this embodiment, the lower rollers can be introduced into the supply chamber 20 before, during, or after curling. In this embodiment, the initial scrolling space 97 closely inscribes the sleeve 94 at the finish of curling (134).

In curling (134), the filmstrip 12 is advanced and the free end 40 of the leading portion 38 is transported into the chamber. Outer ears 101 or the film bridge 76 or other guides (not shown) direct the free end 40 into the sleeve 94 through the gap 105. The sleeve 94 is pushed around the inside of the sleeve and curls in contact with the sleeve 94, forming a coil or initial film scroll 114 of one or more turns. In the embodiment shown in the figures, the outer roller 102 extends through the gap 105 and is in contact with the filmstrip 12 during curling (134) and can freewheel or can propel the filmstrip 12 either alone or in combination with the film transport 78. A similar gap (not shown) can be provided for the lower rollers 88, which can be driven in a similar manner. In the embodiment shown in the figures, the lower rollers 88 are separated from the curling filmstrip 12 by the sleeve 94 and do not function until withdrawal of the sleeve 94.

After curling (134), the sleeve 94 is withdrawn in a direction parallel or substantially parallel to the curling axis 91. In the embodiment shown in the figures, the outer roller 102 must also be moved out of the gap 105. It is highly desirable in so doing, that the outer roller remain in a position to define an initial scroll space 114 closely approximating the dimensions of the curling space 89. This necessary motion can be accomplished by pivoting the pivot arm 112 slightly; however, it is preferable to rotate the sleeve 94 slightly prior to axial sleeve removal such that the outer roller 102 travels out of the gap 105 and rides up onto the sleeve 94. The sleeve 94 is then removed in an axial direction and the outer roller 102 skids against the sleeve 94. The retracting of the sleeve 94 after forming the initial scroll 114 can be responsive to a sensor (not shown) that detects film travel or a timing mechanism or the like.

The main portion 44 of the filmstrip 12 is next propelled into the scrolling space 97 by the film transport 78 or rollers 88,102, or both. It is desirable that the filmstrip 12 have low tension entering the scrolling space 97, since excessive tension could cause the film scroll to distort. Friction reduction can be provided on the film path 74. For example, air can be blown through holes in the vacuum/air belt 82 of a film bridge 76 to provide an air cushion.

The main portion 44 is propelled around the scrolling space 97 by the rollers 88,102. This winds or wraps (136) the main portion 44 of the filmstrip 12 over the initial film scroll 114. As the main portion 44 wraps, the forming scroll 104 rotates within the scrolling space 97. During scrolling, the separation of the lower and upper rollers 88,102 increases, which increases the diameter of the scrolling space 97. It is highly preferred that parallel relation of the axes 90,108 be maintained during scrolling. In an embodiment of the invention, the inner rollers 88 is held in constant positions relative to supply chamber 20, and the outer roller 102 is moved away from the inner rollers 88. In another embodiment of the invention, the inner rollers 88 are lowered into the supply chamber 20 during film winding (in the direction indicated by arrow 140 in FIG. 13b). The outer roller 102 remains in a constant positional relation to the supply chamber 20, throat 17, and film path 74. This approach has the advantage that the filmstrip 12 is continuously maintained in tangency between the apex or outermost turn of the film scroll 104 and the film entrance 142 or downstream end of the film bridge 76 so as to minimize the force applied to the filmstrip 12 during winding. Thus, in this embodiment, the axes 90 of rotation of inner rollers 88 are moved away from the axis of rotation 108 of the outer roller 102 during winding, and deeper into the supply chamber 20. It is further preferred that the lower rollers 88 each move in a separate direction radial to the central axis 182 of the film space 26. In the embodiment shown in the figures, the lower rollers 88 start out near the center of the film space 26 and move into corners of the chamber 20.

Scrolling is continued until the main portion 44 of the filmstrip 12 has been wound over the initial film scroll 114, forming a fully wound, gripped film scroll 137. The remaining or trailing portion 42 of the filmstrip 12 remains attached to the spool 34 in the film cartridge 30 and after winding extends across the intermediate portion 22 to the final film scroll 98. The rotation of the rollers 88,102 is stopped before an excessive strain is placed on the trailing portion 42. This may be done in a variety of ways. For example, a sensor (not shown) can detect an increased load on the lower rollers 88 due to reaching the trailing portion 42; or count rotation of the film spool 34 or another rotating part; or track the length or area of filmstrip 12 traveling to the film roll; or film can be wound for a predetermined time. With any of these approaches a slip clutch (not shown) can be provided in the lower rollers drive 92 to accommodate excessive strain.

The film scroller 86 and other components 56 of the apparatus 10 of the invention are next withdrawn (150), relative to the camera frame assembly 14, which is then moved along for further processing. In embodiments of the invention having a film bridge 76, the camera frame assembly 14 is first displaced relative to the film bridge 76, and slack in the filmstrip 12 is taken up by scrolling a final portion of the filmstrip 12 or retracting that filmstrip portion back into the cartridge 30.

Removal of the film scroller 86 can be accompanied by stripping the fully wound film scroll 137 away from the lower rollers 88,102. The fully wound film scroll 137 removes easily since it is not cinched or tightly held; however, it is desirable that lateral movement of the fully wound film scroll 137 be prevented during withdrawal of the lower rollers 88. This can be accomplished by blocking the lateral movement of the film scroll 137 with a stripper 188 (indicated in dashed lines in FIG. 4). The stripper 188 can be a part of the film scroller positioned to engage the final scroll as the lower rollers 88 are withdrawn. The exact dimensions of the stripper are not critical. Contact with any arc of the film scroll 137 is sufficient to retain the film scroll 98 in place as the lower rollers 88 are extracted. Movement of the film scroll can also be limited in other ways, for example, by gravity or inertia.

In the embodiment of the invention shown in the figures, the use of a stripper is unnecessary, since the diameter of the fully wound film scroll 137 is substantially the same as the diameter of the final film scroll 98 and the width of the supply chamber 20. In this embodiment, prior to removal, the lower rollers 88 are moved out of contact with the film scroll 137 at the end of winding. The fully wound film scroll 137 clock-springs a slight or negligible amount against the supply chamber 20 and the lower rollers 88 can be removed.

After the scroll former 86 has been removed, the rear opening 28 of the camera frame assembly 14 is light-tightly closed (152). Referring now to FIG. 14, in a particular embodiment of the invention, this is accomplished by placing a light-tight rear cover 154 over the chambers 18,20 and intermediate section 22 and a light-tight front cover 156 over the camera frame assembly 14. The resulting camera assembly can be a completed camera or can be completed in further assembly operations. In addition to the features already discussed, including a film cartridge 30 and film scroll 90, the camera can also include other conventional camera features well known to those of skill in the art.

The invention has been described in detail with particular reference to certain preferred embodiments thereof, but it will be understood that variations and modifications can be effected within the spirit and scope of the invention.

PARTS LIST apparatus 10
filmstrip 12
camera frame assembly 14
throat of cartridge chamber 15
camera frame 16
throat of supply chamber 17
cartridge chamber 18
side opening 19
supply chamber 20
end wall 21
intermediate section 22
interior wall 24
film space 26
rear opening 28
film cartridge 30
canister 32
spool 34
leading portion 38
free end 40
trailing portion 42
main portion 44
exposure system 46
camera film drive 48
film engagement member 50
receiver 54
components 56
double-headed arrow 57
pallet 58
indexing features 60
movement system 62
stations 64
actuation mechanism or locator 66
cartridge mover 68
vacuum gripper 70
active light lock opener 72
spool rotator 73
film path 74
film bridge 76
film transport 78
friction reducing features 79
gap 80
belt 82
idlers 83
belt drive 84
vacuum-compressed gas unit 85
scroll former 86
support 87
lower rollers 88
curling space 89
lower roller axes 90
curling axis 91
lower roller drive 92
support arm 93
sleeve 94
scrolling space axis 96
scrolling space 97
final film scroll 98
outer margin 99
inner margin 100
outer ears 101
outer roller 102
inner ears 103
forming film scroll 104
gap 105
biaser 106
belt 107
outer roller axis 108
motor 109
segments 110
pivot arm 112
initial film scroll 114
edges 117
placing frame assembly on receiver (118)
wheel shaped segments 119
positioning cartridge (120)
shaft 121
advancing filmstrip (122)
retaining cartridge in position (124)
introducing inner roller (126)
introducing curling guide (128)
disposing outer roller over inner roller (130)
preventing filmstrip from engaging film drive (132)
curling leading portion of filmstrip into initial film scroll (134)
winding main portion (136)
fully wound, gripped film roll 137
arrow 140
film entrance 142
stripper 146
withdrawing components (150)
closing (152)
rear cover 154
front cover 156
pulleys 158
shafts 160
bearings 162
outside ends 164,166
Inside ends 168,170
tines 169
Belts 172,174
Connectors 176
Link rods 178
linear actuator 180
central axis 182
elbow linkage 184
linear actuator 186
stripper 188

What is claimed is:

1. A method for loading photographic film, comprising the steps of:

positioning a film cartridge in a cartridge chamber of a camera frame assembly having said cartridge chamber, a supply chamber, and an intermediate section between said chambers, said film cartridge including a spool and a filmstrip, said filmstrip having a leading portion, a main portion and a tail portion;

introducing a sleeve into said supply chamber;

disposing an upper roller over said sleeve;

introducing a pair of lower rollers into said supply chamber, said upper and lower rollers together defining a substantially cylindrical scroll space;

advancing said leading portion of said filmstrip out of said cartridge and into said sleeve;

curling said leading portion, within said sleeve and said scroll space into an initial filmstrip scroll having at least one turn;

propelling said main portion of said filmstrip between said upper and lower rollers to wind said main portion of said filmstrip over said initial scroll;

during said propelling, increasing the spatial separation of said lower rollers from said upper roller to increase the diameter of said scroll space;

removing said rollers; and light-tightly closing the camera frame assembly.

2. The method of claim 1 further comprising retracting said sleeve after said curling step.

3. The method of claim 1 wherein said propelling step further comprises driving said lower rollers at a circumferential speed in excess of the circumferential speed of said upper roller.

4. The apparatus of claim 3 wherein said propelling step further comprises driving said lower rollers at a circumferential speed less than about 10 percent greater than the circumferential speed of said upper roller.

5. The method of claim 3 wherein said propelling step further comprises driving said lower rollers about 1-2 percent faster than said upper roller.

6. The method of claim 1 further comprising moving said lower rollers further into said supply chamber during said propelling.

7. The method of claim 6 wherein said filmstrip scroll has a scroll axis and said moving step further comprises moving said lower rollers in a direction substantially radial to said scroll axis.

8. The method of claim 1 further comprising maintaining said upper roller in substantially fixed relation to said supply chamber during said propelling.

9. The method of claim 1 further comprising gripping only the lateral margins of said film during said propelling.

10. The method of claim 1 further comprising substantially restricting lateral movement of said filmstrip during said propelling.

11. The method of claim 1 wherein said curling step further comprises pushing said leading portion against said sleeve.

12. The method of claim 1 further comprising, prior to said positioning step, opening an active light lock of said film cartridge.

13. The method of claim 1 further comprising retaining said cartridge in said camera frame assembly during said propelling step.

14. A film loading apparatus, for use with: a camera frame assembly including a camera frame having a cartridge chamber, a supply chamber, and an intermediate section disposed between said chambers; and a film cartridge disposed in said cartridge chamber, said film cartridge having a case and a filmstrip, said filmstrip having a leading portion, a main portion and a tail portion; said film loading apparatus comprising:

a receiver for the camera frame assembly, said receiver defining sites for said chambers and said intermediate section;

a sleeve movable between a first position outside said supply chamber and a second position inside said supply chamber;

a pair of lower rollers movable, independent of said sleeve, between a rest position outside said supply chamber and a use position inside said supply chamber;

an upper roller disposable over said sleeve when said sleeve is in said second position, said upper roller and said lower rollers together defining a cylindrical scroll space;

a film transport disposed to propel said leading portion of said filmstrip to said scroll space; and a roller drive rotating said lower and upper rollers.

15. The apparatus of claim 14 further comprising means for biasing said upper roller toward said lower rollers.

16. The apparatus of claim 14 further comprising a repositioner connected to said lower rollers, said repositioner lowering said lower rollers relative to said upper roller during rotating of said lower rollers.

17. The apparatus of claim 16 wherein said film scroll defines a film scroll axis and said repositioner moves said lower rollers in two different directions during said lowering, each said direction being substantially radial to said film scroll axis.

18. The apparatus of claim 14 wherein said roller drive rotates said lower rollers at a circumferential speed in excess of the circumferential speed of said upper roller.

19. The apparatus of claim 18 wherein said roller drive rotates said lower rollers at a circumferential speed less than about 10 percent greater than the circumferential speed of said upper roller.

20. The apparatus of claim 14 wherein said roller drive rotates said lower rollers at a circumferential speed about 1-2 percent greater than the circumferential speed of said upper roller.

21. The apparatus of claim 14 wherein said rollers are centrally relieved.

22. The apparatus of claim 14 wherein said upper roller has a pair of spaced apart roller segments, said segments each having a common axis of rotation.

23. The apparatus of claim 22 wherein said upper roller has a pair of radially extending end flanges, said end flanges having a separation substantially equal to the transverse dimension of said filmstrip.

24. The apparatus of claim 14 wherein said sleeve defines an initial scroll space about 10 mm in diameter.

25. The apparatus of claim 14 wherein each of said lower rollers have a smaller diameter than said upper roller.

* * * * *